Patented Oct. 24, 1944

2,361,044

UNITED STATES PATENT OFFICE 2,361,044

PRODUCTION OF STILBENE

William J. Mattox, Riverside, Ill., assignor to Universal Oil Products Company, Chicago, Ill., a corporation of Delaware No Drawing. Application October 11, 1943, Serial No. 505,843

5 Claims. (Cl. 260—668)

This invention relates to the dehydrogenation of dibenzyl to produce stilbene and is more specifically concerned with the catalytic conversion of dibenzyl to produce high yields of stilbene.

The compound stilbene, because of its unsaturated character is very reactive and may be employed as a starting material in various organic syntheses to produce products which may be used in the manufacture of dyes, paints, resins and various other similar products. Large scale utilization of stilbene in organic syntheses has been prevented by the lack of a suitable process for producing stilbene in quantities which are commercially attractive.

It is well known in the art that stilbene may be produced from dibenzyl by pyrolysis at high temperatures. However, because of the numerous side reactions, principally decomposition, which occur simultaneously with the dehydrogenation reaction, the yield of stilbene has been too small to be of any particular value commercially.

It is an object of the present invention to provide a method for producing stilbene from dibenzyl in yields heretofore considered unattainable, these yields being sufficiently large to permit the use of the highly reactive stilbene in organic syntheses operating on a commercial scale.

In one broad embodiment, the present invention comprises a process for producing stilbene by dehydrogenating dibenzyl with a catalyst comprising alumina and an oxide of an element selected from the group consisting of vanadium, chromium, and tungsten.

I have found that the use of these catalytic materials under selected conditions of operation give once through yields of stilbene of the order of 20-50 per cent by weight depending upon the particular operating conditions chosen and the catalyst used.

These catalytic materials may be prepared by many alternative methods. The alumina used as a support may be obtained by the calcination of treated natural alumina deposits such as bauxite or by the precipitation of hydrated alumina from a solution of an aluminum salt such as aluminum sulphate, chloride, acetate, bromide, etc., or from an aluminum compound such as sodium aluminate, following by washing, drying, and calcining. A particularly suitable type of aluminum is the "activated alumina" of commerce.

The alumina granules, powder or preformed shapes such as pellets or spheres may be impregnated with solutions of compounds of vanadium, tungsten, or chromium which upon heating form the catalytic oxide on the catalyst. The impregnated alumina is then dried and heated to about 500 to 700° C. for a period of one to 10 hours before use.

The catalysts may also be prepared by co-precipitation of the hydrated aluminum oxide and other catalytic oxides. Gels of these oxides have also been found to produce suitable catalysts. The concentration of the oxide on the alumina will vary between about 4 to about 40 per cent by weight and preferably between about 6 to about 20 per cent.

The operating conditions of temperature, pressure, and space velocity which may be employed will vary within well defined ranges. Temperatures within the range of about 450° C. to about 700° C. and preferably between about 500 to 600° C. are suitable. The reaction may be conducted at subatmospheric to substantially superatmospheric pressures of about 500 pounds or more. The space velocity measured as a unit of charge per unit of catalyst per hour and more conveniently expressed as the volumes of charge per hour per volume of catalyst may be varied between the range of about 0.1 to about 10, and preferably within the range of about 1 to 5.

The composite catalysts of the present invention may be employed in either the powder, granular, or shaped form. The powdered form is employed in a fluidized operation wherein the heated hydrocarbons are introduced into the bottom of a reaction zone containing the catalyst at a rate such that the upward velocity of the hydrocarbon keeps the bed in a fluidized state. The reaction products containing entrained catalyst particles are passed through a separating zone in which the entrained catalyst is removed and the catalyst-free stream of reaction products separated into the desired stilbene and unconverted dibenzyl which is recycled to the reaction zone. The contaminated catalyst particles having carbonaceous deposits thereon are regenerated by burning off the carbonaceous deposit by air or other oxygen-containing gases.

The granular or shaped particles may be employed in an operation having a catalyst bed in fixed bed relationship to the incoming hydrocarbons or a moving compact bed which travels through the reaction zone into a regenerating zone and is returned to the reaction zone after regeneration.

Under certain conditions of operation, particularly those at which a high conversion per pass, for example about 50% is obtained, it is necessary to introduce diluents into the reaction zone to maintain the hydrogen concentration at a reasonably low level to prevent excessive decomposition due to destructive hydrogenation. Such materials as benzene, toluene, or low boiling hydrocarbons such as propane, ethane, and methane may be added to the reaction stream to decrease the effective partial pressure of the hydrogen.

Dibenzyl employed as the charging stock may be readily obtained by the interaction of benzene with symmetrical dichloroethane in the presence of a Friedel-Crafts type catalyst or it may be obtained by reacting benzene and acetylene in the presence of phosphoric acid, hydrogen fluoride, sulfuric acid, or aluminum chloride.

The following examples are typical of the results obtainable when dehydrogenating dibenzyl in accordance with the process of the present invention.

Example I

A 25 weight per cent dibenzyl-75 weight per cent benzene solution was preheated and passed over a 10 per cent chromium sesquioxide-90 per cent alumina catalyst at 500° C. atmospheric pressure and 1.0 hourly liquid space velocity (volumes of charge at standard conditions per volume of catalyst) for a reaction period of one hour. The recovered liquid products amounted to 95.4 weight per cent of the total charge from which a mixture of stilbene and iso-stilbene amounting to 42 weight per cent was obtained. The stilbene was identified by forming the alpha stilbene dibromide which melted at 237° C. The gas amounted to 4.0% by weight and contained 92.3 mol per cent hydrogen and 7.7 per cent paraffins having a carbon index of 1.21. No detectable quantity of phenanthrene was found in the reaction products.

Example II

Dibenzyl is dehydrogenated under the conditions of operation shown in Example I with a catalyst comprising 12 per cent vanadium oxide and 88 per cent alumina. A yield of stilbene amounting to 35 weight per cent of the dibenzyl charge is obtained.

Example III

Again repeating Example I but employing a catalyst containing 14 per cent tungsten oxide and 86 per cent alumina instead of the alumina-chromia catalyst, a yield of stilbene of about 24 per cent of the dibenzyl charge is obtained.

I claim as my invention:

1. A process for producing stilbene which comprises dehydrogenating dibenzyl in the presence of a catalyst comprising alumina and an oxide of an element selected from the group consisting of vanadium, chromium, and tungsten.

2. A process for producing stilbene which comprises dehydrogenating dibenzyl in the presence of a powdered catalyst composite comprising alumina and an oxide of an element selected from the group comprising vanadium, chromium, and tungsten at a temperature within the range of 450° to 700° C. and at a rate such that the catalyst is maintained in a fluidized state.

3. A process for producing stilbene which comprises dehydrogenating dibenzyl in the presence of a catalyst comprising alumina and an oxide of an element selected from the group consisting of vanadium, chromium, and tungsten, at a temperature of about 450° to about 700° C. and under a pressure within the range of about 0.1 to about 35 atmospheres per square inch absolute.

4. A process for producing stilbene from dibenzyl which comprises subjecting a mixture of dibenzyl and benzene to contact with a dehydrogenating catalyst comprising a composite of alumina and an oxide of an element selected from the group consisting of vanadium, chromium, and tungsten.

5. A process for producing stilbene from dibenzyl which comprises subjecting a mixture of dibenzyl and a diluent to contact with a dehydrogenating catalyst comprising a composite of alumina and an oxide of an element selected from the group consisting of vanadium, chromium and tungsten.

WILLIAM J. MATTOX.